Nov. 28, 1967 W. W. JACKSON 3,354,966
OUTRIGGER TYPE CHISEL PLOW
Filed Oct. 19, 1964 4 Sheets-Sheet 1

FIG. I

INVENTOR.
WILLIAM W. JACKSON

INVENTOR.
WILLIAM W. JACKSON

INVENTOR.
WILLIAM W. JACKSON 3,354,966
OUTRIGGER TYPE CHISEL PLOW
William W. Jackson, Altoona, Iowa, assignor to Deere & Company, Moline, Ill., a corporation of Delaware
Filed Oct. 19, 1964, Ser. No. 404,573
1 Claim. (Cl. 172—311)

This invention relates to agricultural implements and more particularly to chisel plows of the type adapted to be used to work relatively wide strips of ground for seedbed preparation, stubble-mulch and fallow tillage, heavy duty field cultivating and similar operations.

The object and general nature of this invention is the provision of new and improved raising and lowering means for optionally raising and lowering the ground-working tools and raising and lowering outrigger frame sections for use when conditioning the implement for passage along lanes and narrow roadways, through narrow gates or the like or for maneuvering in narrow spaces or other similar areas.

More specifically it is a feature of this invention to provide power means in the nature of a single power cylinder and associated connections optionally disposable for either raising the tools or raising the outriggers, as desired. An additional feature of this invention is the provision of lock-up means for holding the main frame section raised onto its ground wheels, with normally inactive means connected to the single power cylinder for raising the outriggers to narrow the implement.

These and other objects and advantages of this invention will be apparent to those skilled in the art after a consideration of the following detailed description of the preferred embodiment, taken in consideration with the accompanying drawings, in which.

Figure 1:
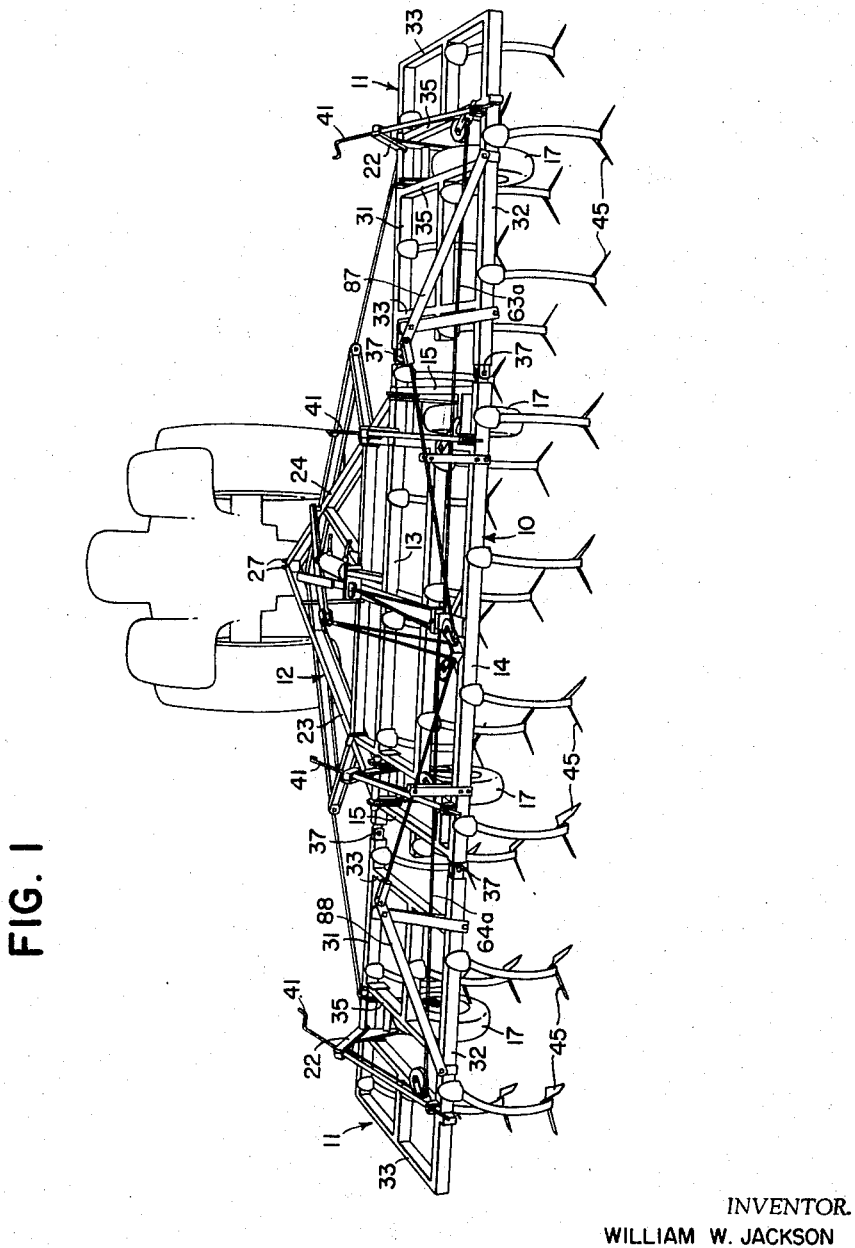
FIG. 1 is a perspective view of a chisel plow incorporating the novel features of this invention.

The chisel plow in which the principles of this invention have been incorporated includes a main frame section 10, two outrigger frame sections 11, and a hitch frame section 12. The main frame section 10 includes front and rear transverse frame bars 13 and 14 preferably of square tubular section interconnected by fore-and-aft extending cross bars 15. The two outer bars 15 at each end of the main frame section 10 are spaced to form a wheel pocket receiving a ground wheel 17 journaled for rotation at the lower end of a yoke 18 that is fixed to a shaft 19 mounted for rocking movement in bearing brackets 21 that are fixed in any suitable way to the frame bars 15. An arm 22 is fixed to each shaft and extends generally directly upwardly therefrom, whereby a pull exerted against the upper end of each arm 22 in a fore-and-aft extending direction will act to raise or lower the wheels 17, thus lowering or raising the associated frame relative to the ground. Further reference to the frame raising and lowering means will be made below.

The hitch frame section 12 forms a rigid part of the main frame section and is made up of a pair of diagonal I beams 23 and 24 rigidly connected at their rear ends, as by welding, to the front frame bar 13. At their forward ends, the hitch bars 23 and 24 are secured together, as by welding, and to a pair of vertical apertured hitch plates 27 to which a propelling tractor may be connected. A center I beam 29 extends from the hitch plates 27 rearwardly to the rear main frame bar 14, being welded to the main frame bars 13 and 14 or otherwise rigidly connected thereto.

The left- and right-hand outrigger frame sections 11 are substantially identical, except that certain parts may be right or left-hand, as required. Hence, a detailed description of one will suffice. Each outrigger frame section 11 includes front and rear transverse frame bars 31 and 32 interconnected by inner and outer fore-and-aft extending cross bars 33 and a pair of intermediate bars 35. The laterally inner portions of the outrigger frame sections are swingably connected by hinges 37 to the associated laterally outer end portions of the center main frame section 10. The laterally outer portion of each outrigger frame section 11 carries a ground wheel arrangement constructed as described above and hence, further description is believed to be unnecessary, the position of each ground wheel relative to the associated frame being manually adjusted by means of a crank screw 41. Each of the main and outrigger frame sections 10 and 11 is provided with a plurality of chisels 45, these tools being conventional so far as this invention is concerned.

When the outrigger frame sections 11 are extended, as in FIG. 1, they lie in coplanar relation with each other and with the main frame section 10, yet the outrigger frame sections 11 are free to swing up and down in conformity with irregularities of the ground surface being worked by the chisels 45. According to this invention, a single power means is provided for raising and lowering the main and outrigger frame sections, with associated ground-working tools, into and out of transport and working position and for raising and lowering the outrigger frame sections relative to the main frame section so as to provide for conditioning the implement to pass along narrow lanes, through conventional farm gates and through other restricted areas.

Figure 3:
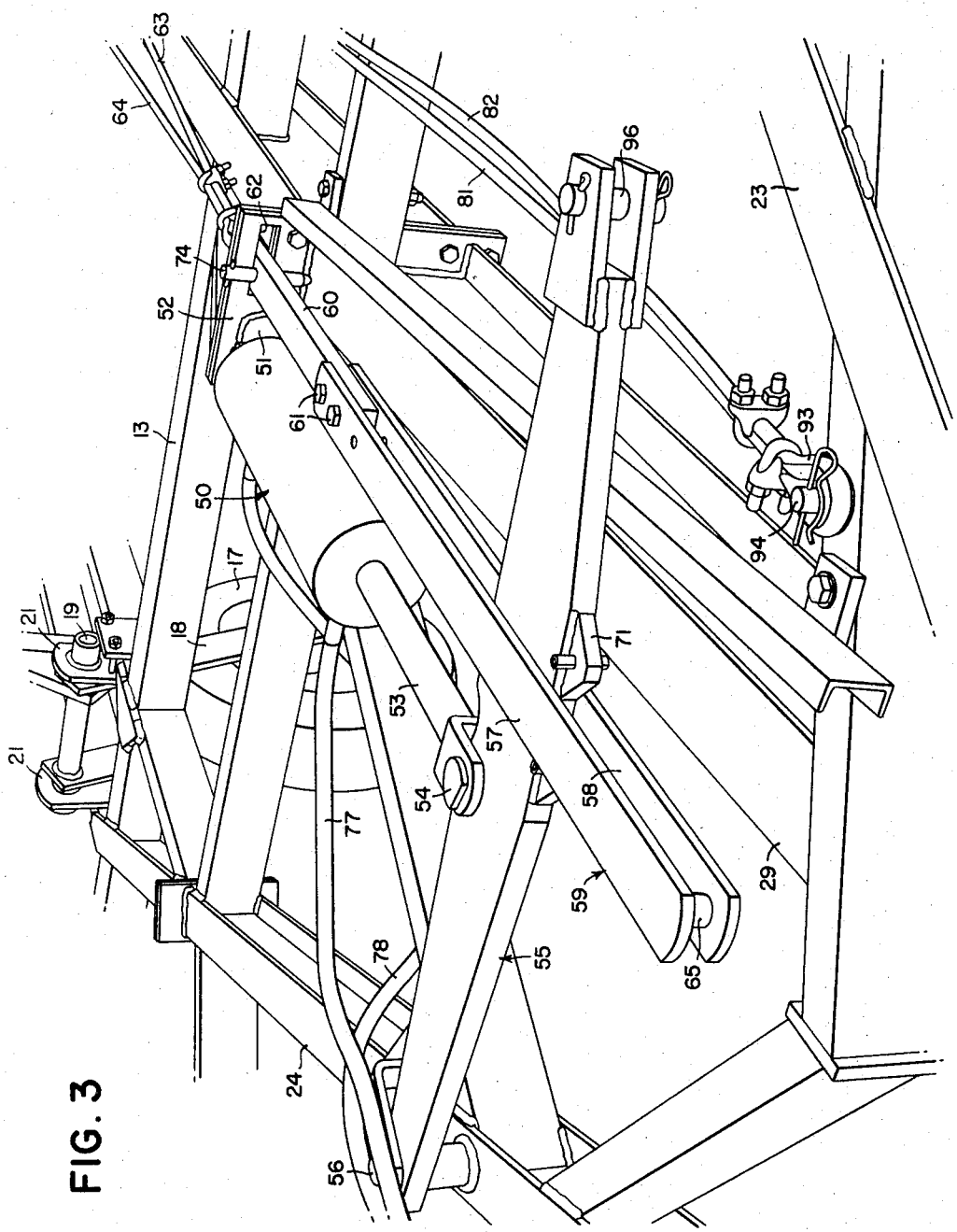
FIG. 3 is a view similar to FIG. 2, showing the power cylinder and associated parts arranged for field transport position with the outriggers widespread.

A power cylinder 50 is carried in any suitable way by the main frame section, having its rear or closed end pivoted to a stud 51 welded to a vertical bracket 52 that is fixed to the frame section 10. The piston rod 53 of the power unit 50 is pivotally connected at 54 to the central portion of a beam or lever 55 that is pivotally mounted at 56 on the right-hand hitch bar 24. The left-hand portion of the lever 55 is shiftably disposed between the upper and lower forward sections 57 and 58 of a pull bar 59, the rear portion of which is formed by a bar 60 bolted, as at 61, to the rear ends of the sections 57 and 58. The bar 60 is slidably supported in a slot 62 formed in the bracket 52. The forward ends of the pull bar sections 57 and 58 are interconnected in spaced apart relation by a pin 65. Cables 63 and 64 extend from a clevis 69 connected to the rear end of the pull bar 59 through sheaves 67 and 68 to the wheel arms 22 for the main frame and outrigger ground wheels, sections 63a and 64a of the cables being secured to the wheel arms 22 of the outrigger frame sections, and sections 63b and 64b being secured to the wheel arms 22 of the main frame section. When the outriggers are lowered and the cylinder 50 extended, the lever 55 is swung forwardly until an abutment 71 on the lever 55 comes up against the pin 65, after which further extension of the cylinder 50 swings the pull bar 59 forwardly and acts through the cables 63, 64 to raise the main and outrigger frame section on the ground wheels, thus raising the tools into a transport position, referred to herein as a field transport position since the frames are disposed laterally in coplanar relation and hence can be transported across the field or through areas where the space is not restricted. When the cylinder 50 is fully extended, an opening 73 in the rear end of the pull bar 59 moves into a position just forward of the bracket 52 and a pin 74 may be inserted in the opening 73 (FIG. 3). The cylinder 50 may now be retracted until the pin 74 bears against the bracket 52 which thus sustains the reaction of the cables 63 and 64 and locks the frames in their raised or field transport position while taking the strain off the cylinder 50. Hydraulic power is delivered from any suitable source of fluid pressure on the tractor to the cylinder through hose line 77 and 78.

As explained above, when it is desired to move the implement along roads and highways, or through lanes, gates, or other restricted areas, it is usually necessary to reduce the width of the implement, and this may be done easily and quickly by raising the outrigger frame sections into vertical positions. According to this invention, the cylinder 50 is also used to raise and lower the outrigger frames by means that will now be described.

Figure 4:
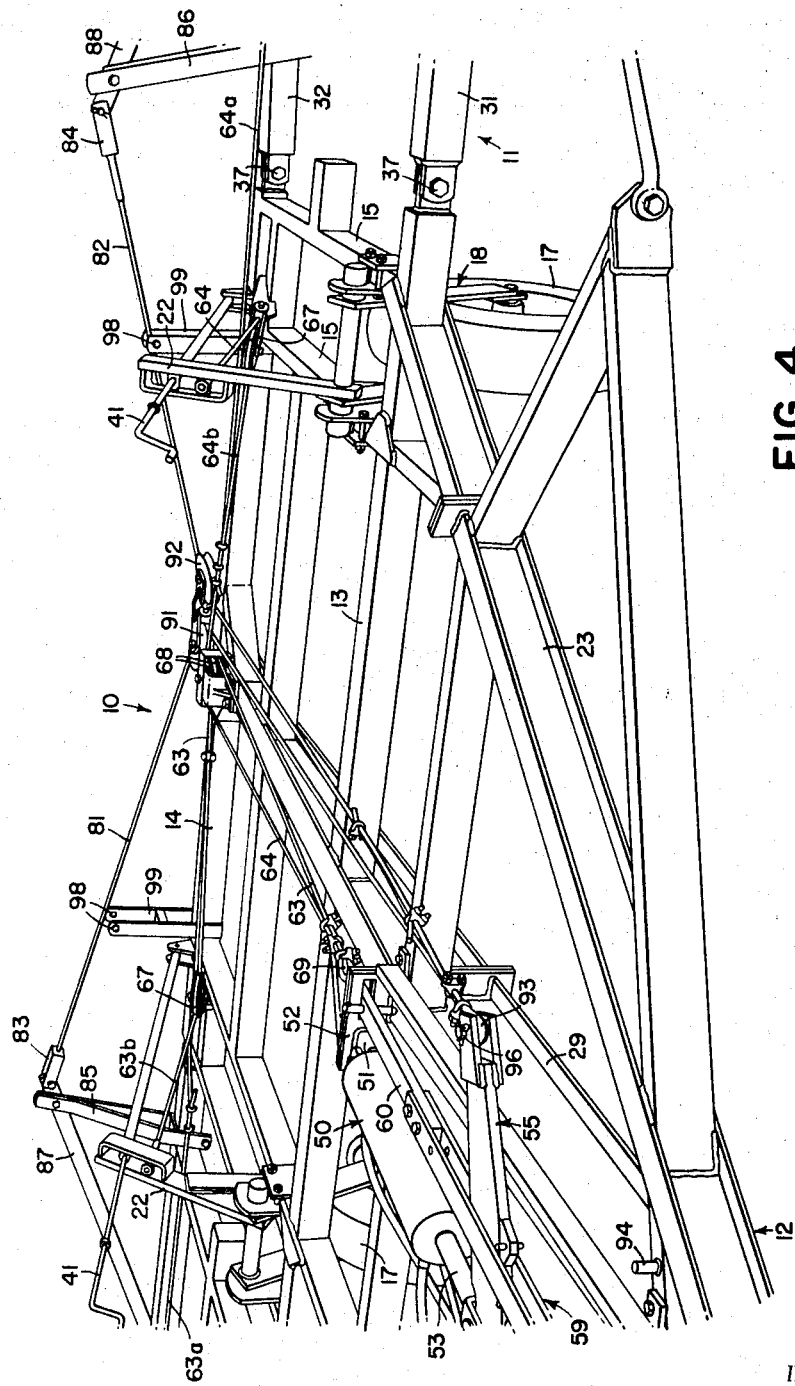
FIG. 4 is a view similar to FIG. 2, showing the power lift parts in a position to raise the outriggers on the main frame section.

After the main and outrigger frame sections have been locked in their field transport position, by inserting the locking pin 74 in the bar 60 in front of the bracket 52, the cylinder 50 may be fully retracted, bringing the lever 55 back to the position shown in FIG. 4. To raise the outrigger frames a pair of cables 81 and 82 are connected at their outer ends by yokes 83 and 84 to arms 84 and 86 fixed rigidly, as by means including braces 87 and 88, to the respective outrigger frame sections. The inner portions of the cables 81 and 82 are extended around sheaves 91 and 92 carried on the main frame section 10 and then brought forwardly and connected by a loop 93 to a pin 96 fixed to the outer end of the lever 55. The cylinder 50 is then extended and the lever 55 is swung forwardly, which exerts a pull on the cables 81 and 82. Acting through the lift arms 85 and 86, the cables 81 and 82 then lift the outrigger frames up to a vertical position, at which time the outer apertured ends of the lift arms 85 and 86 swing into registration with apertures 98 in the outer ends of lock-up saddles 99. Lock-up pins 100 may then be inserted in the registering apertures to lock the outriggers in their narrowed transport position, after which the cylinder 55 may be slightly retracted to take the strain off the cables.

Figure 2:
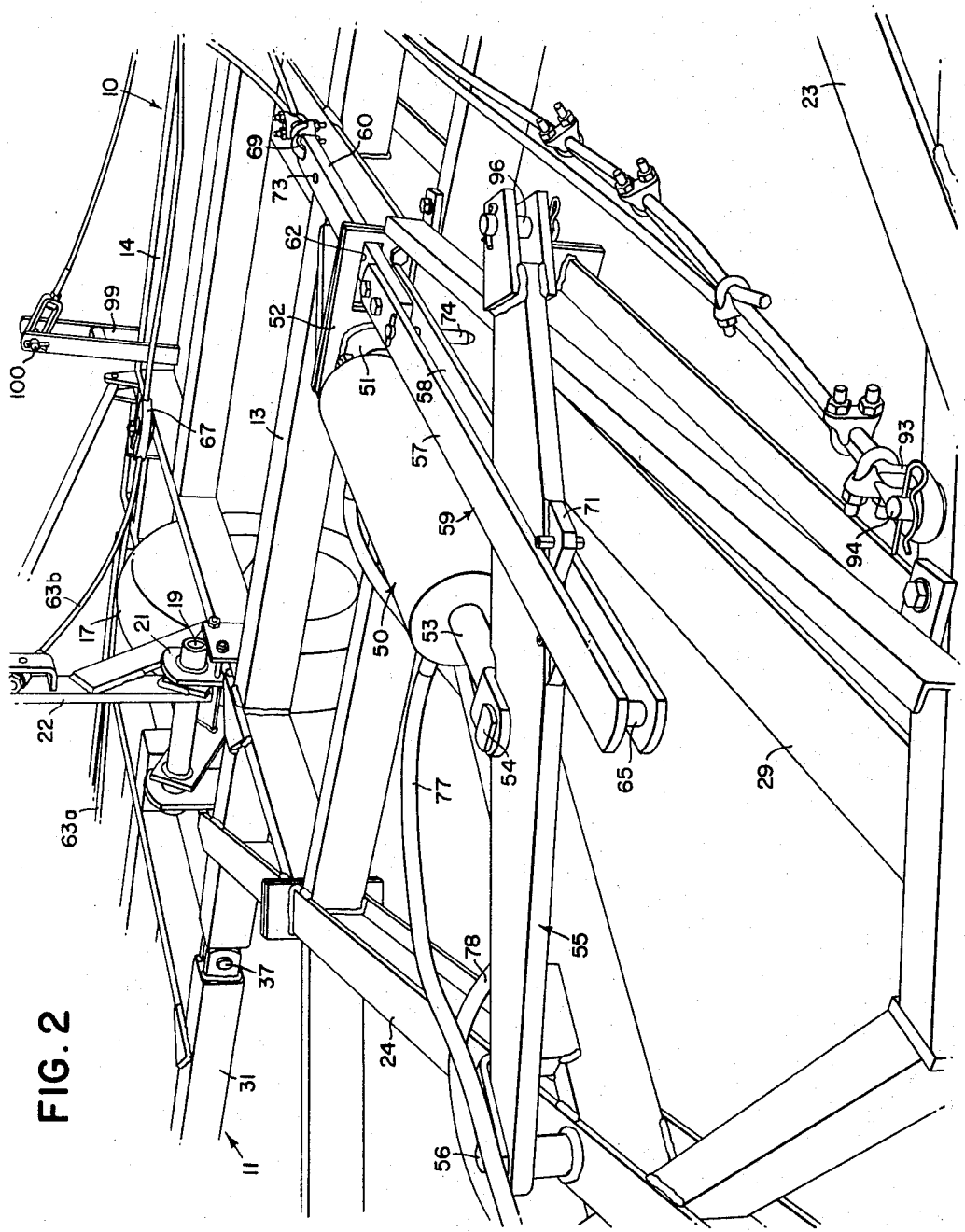
FIG. 2 is a fragmentary perspective view, taken at an enlarged scale, showing the power cylinder and associated parts positioned for field operation, with the outriggers widespread.

When the implement is in its field transport position or in its ground working position, the loop 93 is connected to a storage pin 94 fixed to the forward portion of the hitch frame section 12, and the yokes 83 and 84 are carried on the lock-up saddles 99 by pins 100 as best shown in FIG. 2.

While I have shown and described above a preferred structure in which the principles of this invention have been incorporated, it is to be understood that my invention is not to be limited to the particular details shown and described above, but that, in fact, widely different means may be employed in the practice of the broader aspects of my invention.

What is claimed is:

An implement frame for supporting earthworking tools comprising: a main frame section; a ground support means mounted on said main frame section for movement between transport and working positions relative to the main frame section to respectively raise and lower the main frame section relative to the ground; an auxiliary frame section connected with said main frame section for movement between an extended, operative position and a retracted inoperative position relative to said main frame section; a force transmitting member mounted on the main frame section for movement in one direction to cooperate with the ground support means and move the ground support means toward its transport position, and in the other direction to permit the ground support means to move toward its working position; a two-way power member mounted between the main frame section and force transmitting member operable in one way to move the force transmitting member in said one direction, and operable in the other way to move the force transmitting member in said other direction; means for locking said ground support means in its transport position and for permitting independent two way operation of said power member, and motion transmitting means connected with said auxiliary frame section and selectively cooperable with said force transmitting member for retracting and extending the auxiliary frame section upon said independent operation in one way or the other of said power member.

References Cited

UNITED STATES PATENTS

| | | | |
|---|---|---|---|
| 2,871,028 | 1/1959 | Hibbard | 280—476 |
| 2,699,715 | 1/1955 | Shelton | 172—708 |
| 2,754,739 | 1/1956 | Estes | 172—708 X |
| 2,828,680 | 4/1958 | Johnson | 172—310 |
| 2,960,346 | 11/1960 | Hunter | 172—502 X |
| 2,982,080 | 5/1961 | Martin | 172—456 X |
| 3,003,789 | 10/1961 | Calkins | 172—456 X |
| 3,156,306 | 11/1964 | Dunker | 172—456 |

ABRAHAM G. STONE, *Primary Examiner.*

T. GRAHAM CRAVER, *Examiner.*

J. R. OAKS, *Assistant Examiner.*